United States Patent Office 3,009,852
Patented Nov. 21, 1961

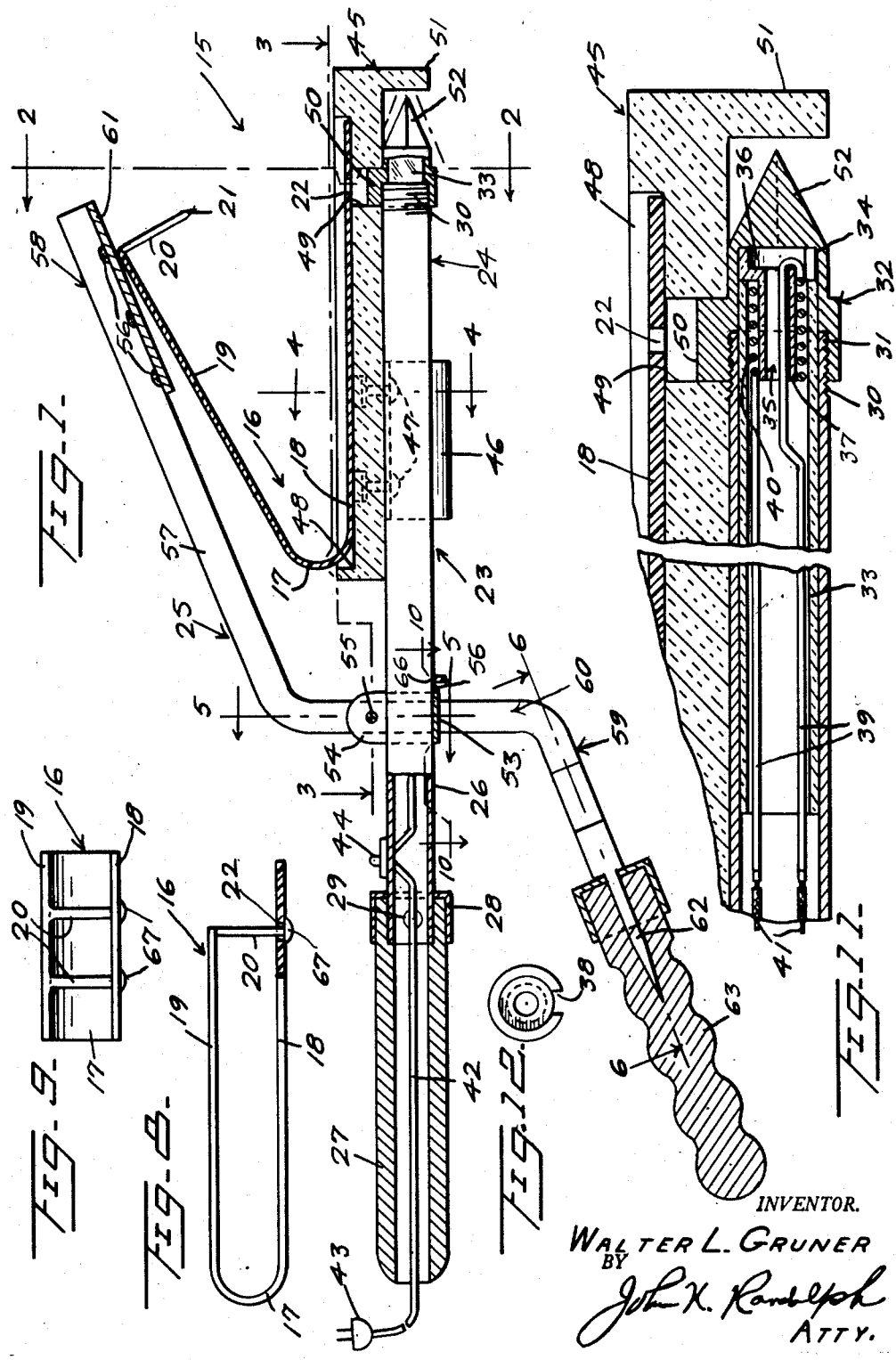

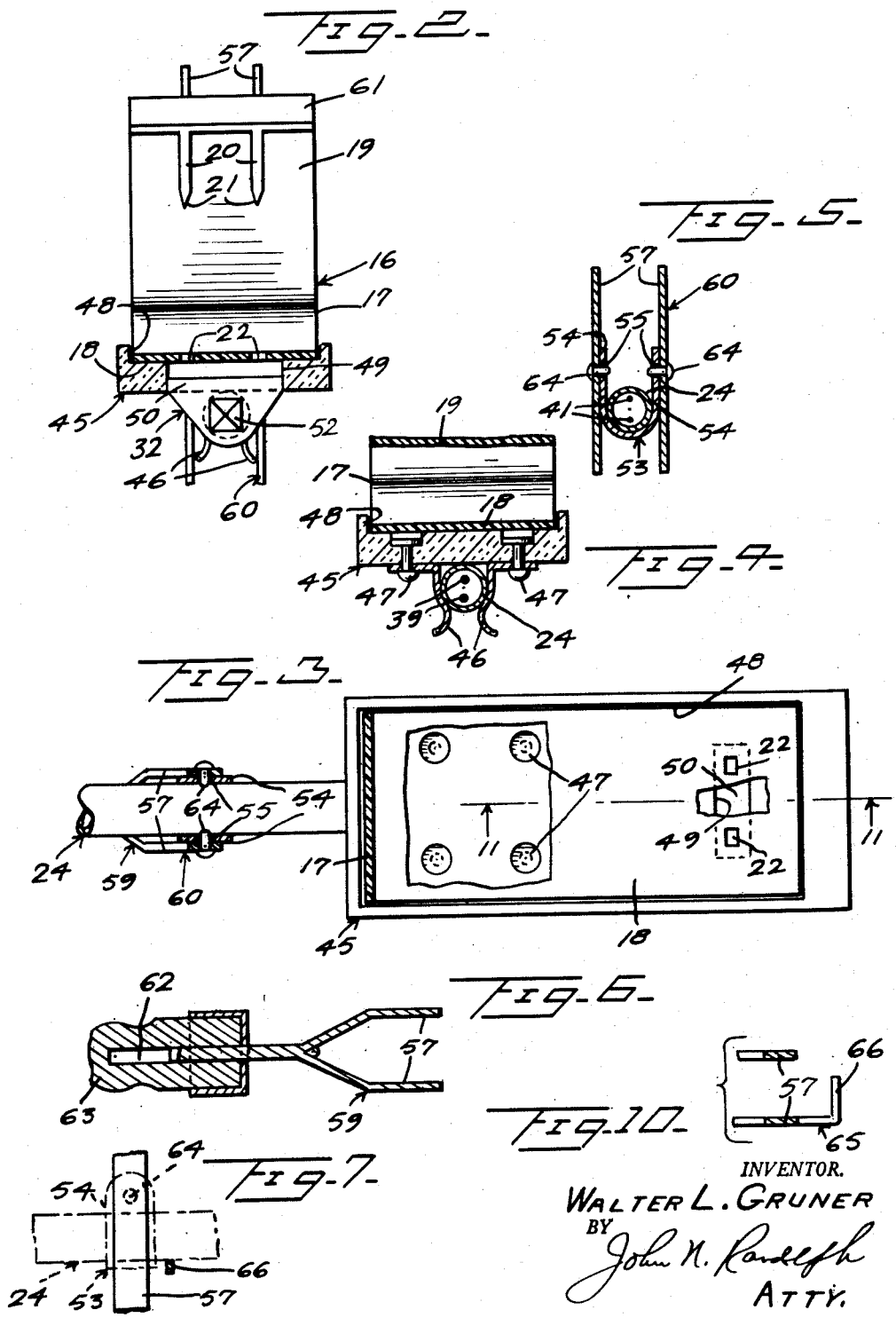

3,009,852
PLASTIC TAG AND APPLYING TONGS
THEREFOR
Walter L. Gruner, W. Main St., Washingtonville, N.Y.
Filed Jan. 22, 1960, Ser. No. 4,148
6 Claims. (Cl. 156—579)

This invention relates to a novel construction of tag having a part for piercing an element to be tagged and which part is thereafter readily welded by heat to another part of the tag for effectively securing the tag in a closed and locked position in a manner such that the tag cannot be removed from the tagged element or opened without destroying the tag.

Another object of the invention is to provide a novel pair of tongs by which the tag can be effectively held and closed for causing the tag to pierce the part, to which the tag is to be attached, and which tongs is provided with means to thereafter secure the tag in a closed position by a welding operation.

Another object of the invention is to provide a pair of tag applying tongs capable of being quickly and easily converted into a soldering iron.

Still a further object of the invention is to provide a unique combination of tag and tag applying tongs, which tongs are uniquely constructed to cooperate with structural features of the tag to enable the tag to be applied and sealed successively by a single closing operation of the tongs.

Various other objects and advantages of the invention will hereinafter become more fully apparent from the following description of the drawings, illustrating a presently preferred embodiment thereof, and wherein:

FIGURE 1 is a side elevational view, partly in section, showing the applying tongs in an open position and with a tag disposed therein;

FIGURE 2 is a fragmentary cross sectional view, taken substantially along a plane as indicated by the line 2—2 of FIGURE 1;

FIGURE 3 is a fragmentary horizontal sectional view, taken substantially along the line 3—3 of FIGURE 1;

FIGURES 4 and 5 are fragmentary cross section views, taken substantially along planes as indicated by the lines 4—4 and 5—5, respectively, of FIGURE 1;

FIGURE 6 is a fragmentary longitudinal sectional view, taken substantially along a plane as indicated by the line 6—6 of FIGURE 1;

FIGURE 7 is a detailed view partly in side elevation and partly in section, of a portion of the tongs;

FIGURE 8 is a side elevational view showing the tag closed and sealed;

FIGURE 9 is a front elevational view thereof, looking from right to left of FIGURE 8;

FIGURE 10 is a fragmentary sectional view through a part of the tongs, on a somewhat enlarged scale, taken approximately along the line 10—10 of FIGURE 1;

FIGURE 11 is an enlarged fragmentary longitudinal sectional view, taken substantially along the line 11—11 of FIGURE 3, with certain of the parts omitted, and FIGURE 12 is an end elevational view of one of the parts illustrated in FIGURE 11.

Referring more specifically to the drawings, the plastic tag and tag applying tongs, comprising the invention, as an entirety is designated generally 15 and includes a tag, designated generally 16, formed from a single elongated strip of a plastic material which is turned back upon itself intermediate of its ends at 17 to provide a lower side 18 and an upper side 19. As best seen in FIGURE 8, the lower side 18 is somewhat longer than the upper side 19. The free end of the upper side 19, remote from the bend 17, is provided with two transversely spaced prongs 20 which are formed integral therewith, as best seen in FIGURE 9, and which are disposed approximately at a right angle to the plane of the side 19 and extended toward the side 18. The prongs 20 are provided with pointed free ends 21, as best seen in FIGURES 1 and 2. The side 18, at a point spaced from its free end, is provided with transversely spaced openings 22, as best seen in FIGURES 2 and 3, which are positioned to receive therethrough the prongs 20 as the tag 16 is compressed and the sides 18 and 19 thereof approach positions parallel to one another, as seen in FIGURES 8 and 9, from the open position of the tag, as seen in FIGURES 1 and 2.

The tongs, designated generally 23, include levers 24 and 25. The lever 24 includes a rigid tube 26. A tubular handle 27 has a ferrule 28 at one end thereof. One end of the tube 26 is received in said end of the handle 27 and the handle is secured to said tube end by a setscrew 29, as seen in FIGURE 1. The other end of the tube 26 is externally threaded as seen at 30 to threadedly engage in the enlarged open socket end 31 of a heat transmitting head 32.

As best seen in FIGURE 11, a sleeve 33, of porcelain or the like, is disposed in the last mentioned end of the tube 26 and has an end portion extending therefrom into an inner part 34 of the socket of the head 32, of which the portion 31 constitutes the open end of said socket. A thimble 35 has a head 36 which is hollow and which fits snugly in the closed end of the socket 34 and between said closed end and the adjacent end of the sleeve 33. The thimble 35 includes a restricted tubular stem 37 which is supported by the head in the adjacent end of the sleeve 33 and spaced from the wall of said sleeve. The stem 37 opens into the hollow interior of the head 36 and said head is additionally notched, as best seen at 38, in FIGURE 12, to accommodate a part of a wire strand 39. Said strand 39 has an intermediate portion which is wound about the thimble stem 35 to form a heating coil 40. The two ends of the strand 39 extend from the thimble 35 to beyond the end of the sleeve 33, located remote from said thimble, one of said strand ends passing through the tubular stem 37 and being turned back through the notch 38 to merge with one end of the coil 40, as illustrated in FIGURE 11. The two terminals of the strand 39 are secured to the two conductor wires 41 of a conventional electric cord 42 which extends longitudinally through the handle 27 and a part of the tube 26 and which may be of any length and provided at its opposite end with a conventional male plug 43. The wire 39 is preferably nickel chrome and the conductor wire ends 41 are taped thereto in a manner to prevent shorting. A conventional switch 44 may be interposed in the conductor wire 42, as seen in FIGURE 1, for breaking the circuit to the heating element when the plug 43 is connected to an electrical outlet.

A substantially flat block 45 of a heat insulating material has spaced spring jaws 46 depending from the underside thereof and secured thereto by countersunk fastenings 47, as best seen in FIGURE 4. The jaws 46 form a spring clip which detachably engages the tube 26 for mounting the block 45 on the upper side of said tube and over the end thereof containing the heating element 40. The block 45 is disposed longitudinally of the tube 26 and is of substantial thickness to provide a tag supporting bed and has an elongated recess 48 in the upper side thereof, sized to snugly receive therein the lower side 18 of the tag 16. When the tag 16 is thus disposed, as seen in FIGURE 1, the openings 22 thereof are disposed over a transversely elongated opening 49 of the block 45 which opens downwardly through the underside of said block and opens upwardly into the recess 48. The heat conducting head 32 has an upwardly projecting part 50 which fits snugly in the lower part of the opening 49 to combine with the spring clip 46 for detachably mounting the block or bed 45 immovably on the upper side of the lever 24. The block 45 is provided with a depending lip 51 at is forward end forming a shield which is disposed beyond a tapered pointed forward end 52 of the head 32.

A U-shaped member 53 is disposed around the underside of the lever 24 and has upwardly extending legs 54 which straddle said lever and extend upwardly therefrom. The member 53 may be welded, as seen at 56, or otherwise secured to the lever 24 and the legs 54 thereof are provided with aligned apertures 55 which are disposed above said lever 24. Said member 53 is disposed between the handle 27 and the block 45.

The lever 25 includes two transversely spaced bars 57 which are formed of a spring metal having laterally offset substantially parallel end portions 58 and 59 connected by an intermediate portion 60. The end portion 58 forms the jaw portion of the lever 25 and a plate 61 is secured against the inner edges of the bars 57, as by welding, as indicated at 56, so that said plate is located adjacent the terminal of the lever jaw 58. The other ends of the bars 57, constituting a part of the lever end 59, are brought together in abutting engagement and are restricted and tapered to provide an elongated spike 62 which is embedded in an end of a handle 63 for securing the handle to said lever end 59. As best seen in FIGURES 3 and 5, the parts of the bars 57 forming the lever portion 60 have aligned studs or pins 64 fixed to and projecting inwardly therefrom and which detachably engage turnably in the openings 55 for pivotally connecting the lever 25 to the lever 24. The bars 57 are sufficiently resilient so that said bars can be sprung apart from their substantially parallel positions, as seen in FIGURE 5, for engaging the pins 64 with the openings 55 or for disengaging the pins therefrom. One of the bars 57 is provided with an angular extension 65 having a terminal portion 66 extending partially across the gap between said bars and which is offset therefrom to form a stop. The stop 66 is disposed to engage the underside of the lever 24 when the tongs 23 are in an open position, as seen in FIGURE 1, and to prevent the lever 25 swinging further in a counterclockwise direction relative to the lever 24. With the tongs 23 in an open position, as seen in FIGURE 1, the tag 16 is inserted into the jaws of the tongs from right to left and when the lower side 18 of the tag is seated in the recess 48 with the bend of the tag in an innermost position, the free end of the other side 19 of the tag will bear slidably against the upper jaw plate 61.

Assuming that the plug 43 is connected to an electrical outlet and that the plastic tag 16 is mounted in the tongs, as seen in FIGURE 1, the combination 15 is ready for use for applying the tag 16, assuming that the resistance element 40 has heated the heat conducting head 32. If the tag 16 is to be applied to an animal's ear, not shown, for example, a part of the ear is inserted into the tag after which a gripping pressure is exerted on the handles 27 and 63 for swinging the handles toward one another for closing the jaws of the tongs and for closing the tag 16. As the tag 16 is flexed or deformed from its open position of FIGURE 1 toward its closed position of FIGURE 8, the pointed prongs 20 will initially pierce the ear or other article to be tagged, after which said prongs will pass through the two openings 22 and into contact with the head part 50. The part 50 is sufficiently hot to cause the pointed end portions of the prongs 20 to melt quickly and be fused or welded around the openings 22, as seen at 67 in FIGURES 8 and 9, to thus lock the tag in a closed position attached to the article or element to be tagged thereby. The outer surface of either or both sides of the tag 16 may contain suitable identifying indicia. The tong jaws can then be returned to an open position and disengaged from the closed tag 16. It will thus be seen that the tag is closed and locked and the prongs thereof caused to pierce the article to which the tag is applied by a single closing operation of the tongs 23. When the tongs 23 are used for the aforedescribed purpose, the plug 43 is preferably connected to an electrical outlet having a thermostat control to avoid overheating the heat conducting head 32.

The block 45 can be removed from the tube 26, by disengagement of the clip 46, so that the point 52 can then be utilized as a conventional soldering iron nose. If desired, the lever 25 can be disengaged from the lever 24 for using the implement as a soldering iron and can be passed over the forward end of the tube 26 by disconnecting the head 32, which can thereafter be readily reapplied. When the implement is used as a soldering iron the plug 43 is connected to a conventional outlet not having a heat control attachment.

Various modifications and changes are contemplated and may be restored to, without departing from the function or scope of the invention as hereinafter defined by the appended claims.

I claim as my invention:

1. A device of the character described comprising a first lever and a second lever, means pivotally connecting said levers together in cross relation to one another at a point spaced from the lever ends, said levers having complementary ends forming tong jaws adapted to receive therebetween an open identifying tag, when said jaws are in an open position, said levers having opposite ends forming handle portions manually operable for closing the jaws to effect a closing of the tag, heating means carried by one of said jaws and including a part disposed to weld parts of the tag in a closed position, when said jaws are closed, and a heat insulating member carried by said jaw and disposed between said heating means and the tag and having a portion surrounding said part of the heating means.

2. A device as defined by claim 1, said heating means including a heat transmitting element having an outwardly projecting tapered point forming a soldering iron nose.

3. Tag applying tongs comprising a pair of levers pivotally connected together at a point spaced from the ends of the levers, said levers having complementary ends forming jaws and opposite ends forming handles for moving the jaws to open and closed positions, said jaws, when in an open position, being adapted to receive therebetween an open tag, heating means carried by one of the jaws and including a part disposed to weld parts of the tag together for sealing the tag closed when the jaws are moved to a closed position, and a heat insulating member carried by said jaw and disposed between said heating means and the tag and having a portion surrounding said part of the heating means.

4. Tag applying tongs as in claim 3, said heat insulating member including means engaging a portion of the tag to retain the tag correctly positioned so that said tag parts will be disposed in close proximity to said part of the heating means when the jaws are moved to a closed position.

5. A tag applying tool comprising a pair of levers pivotally connected to one another in crossed relation at a point spaced from the ends of said levers, said levers having complementary ends forming jaws, a member mounted on a first one of said jaws and having a recessed face disposed to face the other second jaw, said member having an opening extending through a part of said face, a heating element carried by said first jaw and having a part disposed in said opening, said recessed face being adapted to receive and position a part of a tag with an opening thereof in registration with the opening of said member, said second jaw being adapted to engage another part of the tag having a fusible prong projecting toward the opening of said first mentioned tag part, and said jaws being swingable toward closed positions for causing the prong to pass through the opening of the first mentioned tag part and into the opening of said member to be heated by said heating element part for fusing the prong to the first mentioned part of the tag to heat seal the tag in a closed position.

6. A tag applying tool as in claim 5, said member being formed of a heat insulating material for heat insulating the tag, except the parts thereof which are heat sealed together, from said heating element.

References Cited in the file of this patent

UNITED STATES PATENTS

| | | |
|---|---|---|
| 1,122,280 | Kempshall | Dec. 29, 1914 |
| 1,200,943 | Lenk | Oct. 10, 1916 |
| 1,225,180 | Schaub | May 8, 1917 |
| 1,320,427 | Spurling | Nov. 4, 1919 |
| 1,480,013 | Salbery | Jan. 8, 1924 |
| 1,510,083 | Berntson | Sept. 30, 1924 |
| 2,032,688 | Dart | Mar 3, 1936 |
| 2,094,200 | Ambridge | Sept. 28, 1937 |
| 2,401,991 | Walton | June 11, 1946 |
| 2,579,088 | Piazze | Dec. 18, 1951 |
| 2,669,642 | Menges | Feb. 16, 1954 |
| 2,794,277 | Dryden | June 4, 1957 |
| 2,935,434 | Dawson | May 3, 1960 |